Jan. 29, 1924.
V. BENDIX
CLUTCH
Filed Dec. 3, 1919
1,481,976
2 Sheets-Sheet 1
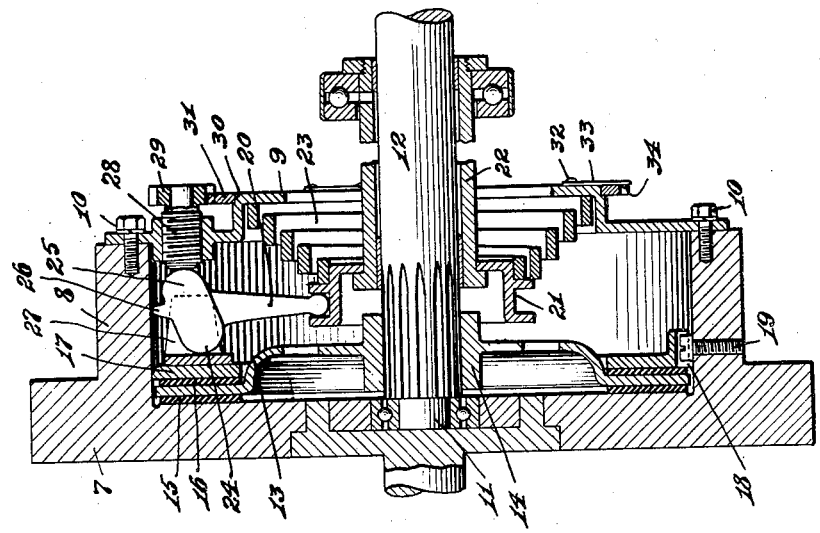
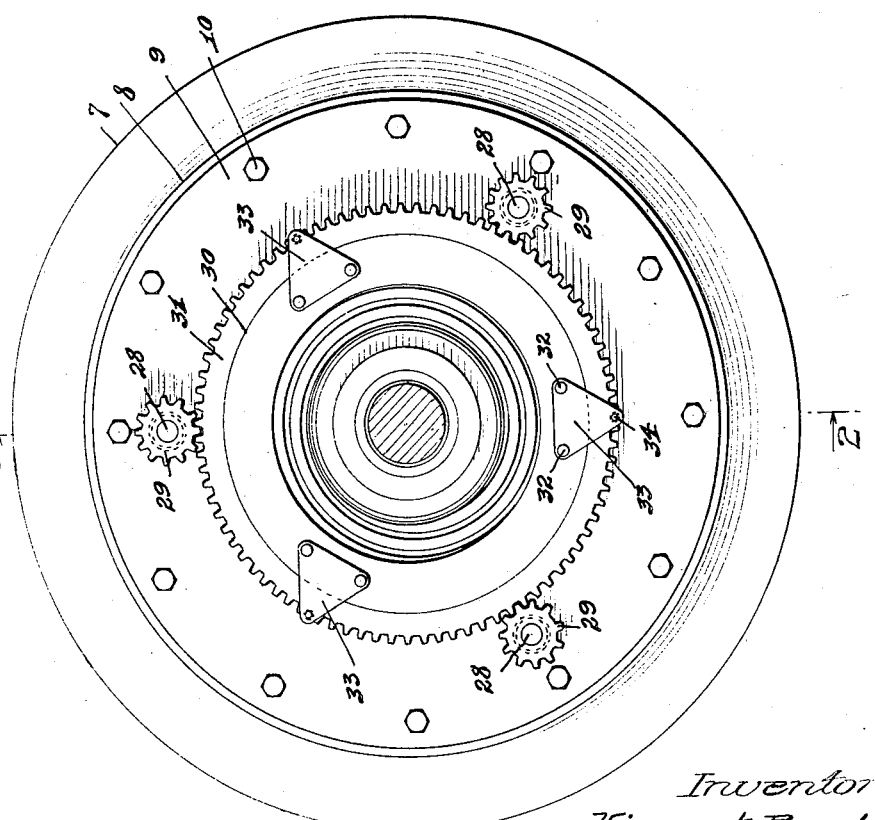
Witness
Martin H. Olsen.
Inventor
Vincent Bendix
By George J. Ottsch
Atty.

Jan. 29, 1924.

V. BENDIX

CLUTCH

Filed Dec. 3, 1919

Witness
Martin H. Olsen.

Inventor
Vincent Bendix
By George J. Oltsch
Atty.

Patented Jan. 29, 1924.

1,481,976

UNITED STATES PATENT OFFICE.

VINCENT BENDIX, OF CHICAGO, ILLINOIS.

CLUTCH.

Application filed December 3, 1919. Serial No. 342,171.

*To all whom it may concern:*

Be it known that I, VINCENT BENDIX, a citizen of the United States, residing at Chicago, in the county of Cook and State of Illinois, have invented certain new and useful Improvements in Clutches, of which the following is a specification.

The invention relates to clutches, and more specifically to friction cluches particularly adapted for controlling the driving mechanism of an automobile.

The object of the invention resides primarily in the provision of a friction clutch, in which the clutching elements are brought into clutching engagement through means including a cam-lever operating to force said elements into frictional contact, and which lever in its relation to other parts influencing its mode of action is such that its movements are guided solely and restricted through sliding contact only with such parts, having no fixed pivotal or fulcrum point. The lever is thus bodily shiftable at its outer or thrust imparting end, which has the advantage of permitting simple means of adjustment to be provided therefor, as well as permits simplification in form and the minimum use of parts. Also, by the provision of opposed cam portions, the effective limit of movement of the lever, in imparting thrust to the clutching elements, is enhanced without diminishing the leverage value of the lever, whereby less frequent adjustment of the lever with reference to the clutching elements acted upon will be required to compensate for wear of the latter.

The invention in the preferred form of details will be described in the following specification, reference being had particularly to the accompanying drawings, in which:

Figure 1 is an end elevation of a clutch embodying the invention.

Figure 2 is a sectional view taken on the line 2—2 of Fig. 1.

Figure 3:
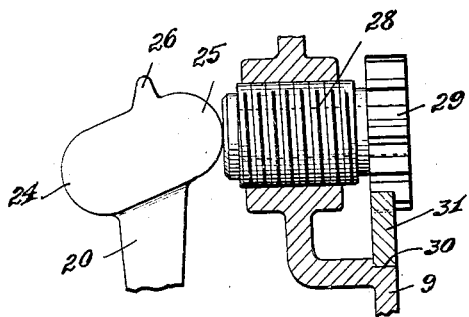
Figure 3 is a fragmentary view, partly in section, showing the outer end of the cam-lever and adjustable abutment therefor.
Figure 4:
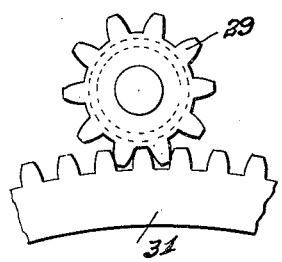
Figure 4 is an end view of the adjustable abutment for the cam-lever and gear connections for turning the abutment.
Figure 5:
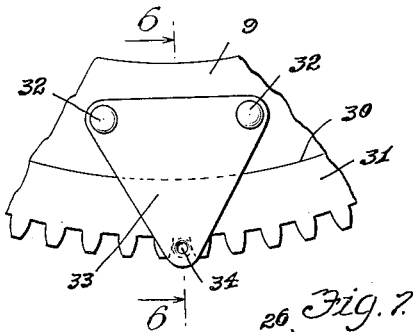
Figure 5 is a fragmentary view of the clutch casing and ring gear, and the locking means for the latter.
Figure 6:
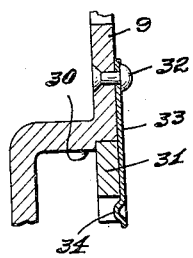
Figure 6 is a sectional view taken on the line 6—6 of Fig. 5.
Figure 7:
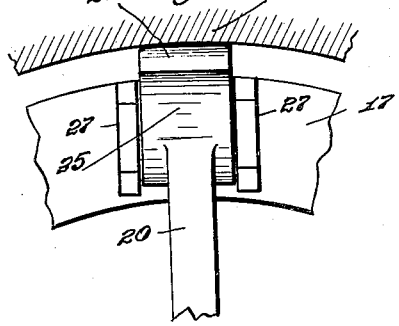
Figure 7 is a detail view of the outer end of the cam-lever in its relation to the ring gear and clutch casing.

The improved clutch is shown as applied to the fly-wheel of an automobile engine, the reference numeral 7 designating such fly-wheel, which is preferably formed with a wide annular flange 8, to provide ample space within the same to house the clutch elements, an end plate 9, suitably bolted thereto, as at 10, in part forming a closure for the housing so formed, and also serving as a support for the clutch adjusting elements, as will presently appear.

Suitably journaled in the fly-wheel, as at 11, is one end of a driven shaft 12, which is adapted to be held against rotation independent of the fly-wheel through intermediary friction grip elements. One of said elements consists of a disk 13, provided with a hub 14, suitably splined to the shaft 12 to permit the same to shift longitudinally of said shaft but held against rotation independent thereof. Interposed between the marginal edge of the disk 13 and the inner face of the fly-wheel is a friction ring 15, which may be of fibroid or any other suitable material, and adapted to bear against the opposite side of the disk 13 is a like friction ring 16. It will be apparent from the foregoing that, upon the application of sufficient pressure against the friction ring 16, the disk 13 will be frictionally held and caused to rotate with the fly-wheel, all in the manner as is well understood in the art.

Adapted to bear against the friction ring 16 inwardly of the fly-wheel, is a thrust ring 17, having a peripheral transverse slot 18, into which extends the head end of a screw-bolt 19 threaded into the fly-wheel as shown, whereby the thrust ring is held against rotation independently of the fly-wheel, but is free to shift toward and from the disk 13. Interposed between the thrust ring 17 and the end plate 9, is what may be termed a cam-lever 20, the inner end of which has connection with the channeled portion of a thrust collar 21, slidable on the shaft 12 through a pedal operated sleeve 22 on which said collar is mounted, all as in the manner shown. The pedal referred to is not shown, as the conventional form and manner of use thereof is well known in the art, and for the purposes of the present invention any suitable means may be employed for shifting the sleeve 22. Interposed between the end plate 9 and the thrust collar 21, is a helical spring 23, tensioned to impart, through the thrust collar, inward throw to the inner end of the cam-lever, and cause the latter to act against and to normally maintain the clutching elements in frictional engagement, the parts being declutched by shifting the sleeve 22 against the resistance of the spring, as in the manner also well understood in the art. As shown, the cam-lever 20 is formed at its outer end with oppositely disposed cam portions 24 and 25, and with an endwise extending point 26, adapted to have a free sliding contact with the inner side of the flange 8, thus serving as a bearing or fulcrum point upon which the cam-lever may turn, as well as preventing endwise displacement thereof through centrifugal action in the rotation of the clutch. The cam portion 24 is adapted to have a sliding contact with the thrust ring 17, which latter is provided with spaced guide lugs 27 for the cam-lever, between which the lever is slidably guided, and held always in proper operative relation with respect to a normally fixed abutment, with which the cam portion 25 of the lever also has a sliding contact, and which abutment will be hereinafter referred to as a screw plug 28, and which serves as a clutch adjusting means. By reference to Fig. 2, it will be apparent that, upon inward movement of the thrust collar under action of the spring, the cam-lever movement will be such as to exert pressure against the thrust ring 17, and bring all of the clutching elements into frictional engagement. The movement of the cam portion 25 with relation to the screw-plug 28 tends to give bodily movement to the outer lever end in the direction of the clutching elements, and the action of the cam portion 24 against the thrust ring 17 in the turning movement thus supplements the effective range of action of the lever. It follows, therefore, that for a given leverage value a greater range of action is obtained for the lever, thus requiring the lever to be less frequently adjusted with relation to the clutching elements to compensate for wear of the latter. It also follows that, by the use of a lever of the character set forth, and in the arrangement and cooperation of the parts as in the manner disclosed, material simplification of structure is produced, with the advantage of less cost of manufacture, less parts to become worn, and less parts requiring replacement through possible breakage.

While only a single cam-lever has been shown and described, in actual practice three such are preferably used, same being positioned in equal degrees of angle from each other, corresponding with the like relative disposition of the screw-plugs 28, threaded through the end plate 9, as shown in Fig. 1. As before noted, said screw-plugs serve as an abutment for, and as a means for adjusting the cam-levers with relation to the thrust ring 17, whereby to compensate for wear of the clutching elements as they become worn thin in the use of the clutch. The screw-plugs are formed on their outer ends with a pinion 29, and rotatively mounted on an annular shoulder or offset 30 formed on the end plate 9, is a ring gear 31, which meshes with the pinion of each screw-plug, and by the manipulation of which ring gear the screw-plugs may be simultaneously and uniformly turned for the endwise adjustment thereof. Secured to the end plate 9, as by means of rivets 32, are snap springs 33, which extend across the ring gear and serve to hold the same to place upon the end plate. The snap springs are formed at their free ends with inwardly projecting beads 34, rounded so as to freely ride over the ring gear teeth in the rotation of the latter, and to lodge between the teeth to automatically lock the ring gear against accidental movement.

Having thus described my invention, what is claimed is:—

1. A clutch comprising a casing, cooperating clutch members, means including a plurality of cam-levers for bringing said members into clutched relation, said levers having freely shiftable terminal fulcrum points bearing upon the casing, and cam portions bearing at opposite points upon one of said clutch members and upon normally fixed elements screw-threaded through the casing, and means for simultaneously adjusting said elements.

2. A clutch comprising a casing, cooperating clutch members, means for bringing said members into clutched relation including a plurality of cam-levers having freely shiftable terminal points bearing upon the casing, and cam portions bearing at opposite points upon one of said clutch members and upon normally fixed elements screw-threaded through the casing, means for simultaneously adjusting said elements, and means for locking the last named means against accidental movement.

In testimony whereof I affix my signature.

VINCENT BENDIX.